(12) United States Patent
Hornkvist

(10) Patent No.: US 8,914,327 B2
(45) Date of Patent: Dec. 16, 2014

(54) METHODS AND SYSTEMS FOR SEARCHING A BACKUP VOLUME

(71) Applicant: Apple Inc., Cupertino, CA (US)

(72) Inventor: John M. Hornkvist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/631,771

(22) Filed: Sep. 28, 2012

(65) Prior Publication Data

US 2013/0246365 A1    Sep. 19, 2013

Related U.S. Application Data

(60) Provisional application No. 61/612,171, filed on Mar. 16, 2012.

(51) Int. Cl.
*G06F 17/30* (2006.01)
(52) U.S. Cl.
USPC ............................................................ 707/651
(58) Field of Classification Search
CPC .................................................... G06F 17/30

USPC ............................................................ 707/651
See application file for complete search history.

(56) References Cited

U.S. PATENT DOCUMENTS

| 8,065,381 | B2 | 11/2011 | Srinivasan et al. | |
|---|---|---|---|---|
| 8,271,445 | B2 | 9/2012 | Hörnkvist et al. | |
| 2005/0216486 | A1 | 9/2005 | Barshefsky et al. | |
| 2006/0230078 | A1 | 10/2006 | McConaughy et al. | |
| 2011/0185253 | A1 | 7/2011 | Resch et al. | |
| 2011/0295806 | A1* | 12/2011 | Erofeev | 707/634 |
| 2012/0011099 | A1 | 1/2012 | Shin et al. | |
| 2012/0143825 | A1* | 6/2012 | Boehm et al. | 707/648 |
| 2012/0311279 | A1* | 12/2012 | Hong et al. | 711/162 |
| 2012/0317077 | A1* | 12/2012 | Chung | 707/634 |

* cited by examiner

*Primary Examiner* — Apu Mofiz
*Assistant Examiner* — Cindy Nguyen
(74) *Attorney, Agent, or Firm* — Blakely, Sokoloff, Taylor & Zafman LLP

(57) ABSTRACT

Methods and systems for searching a backup volume use, in one embodiment, a move marker file to indicate attributes for a new name space and optionally indicate attributes for a prior name space of a directory on a source volume, the directory having been moved between backup snapshot operations in which data on the source volume is backed up to the backup volume. Other embodiments are also described.

19 Claims, 6 Drawing Sheets

METHODS AND SYSTEMS FOR SEARCHING A BACKUP VOLUME

CROSS-REFERENCE TO RELATED APPLICATIONS

This application claims benefit of U.S. Provisional Application No. 61/612,171, filed Mar. 16, 2012, and hereby incorporates herein this provisional application.

BACKGROUND OF THE INVENTION

The present invention relates to the field of searching on data processing systems and searching on backup systems which contain backup data for data processing systems.

Figure 1A:
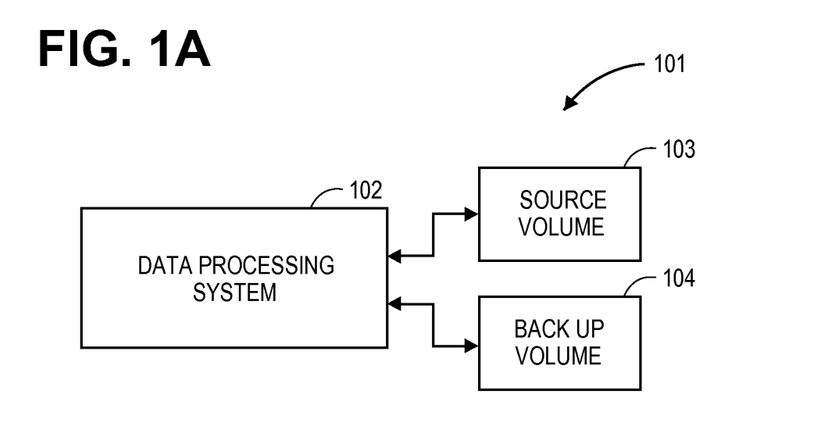
FIG. 1A shows a block diagram representation of a data processing system with two storage volumes.

Data processing systems often employ backup systems to keep a backup copy of data and software applications in case the original copy becomes corrupted or destroyed or is otherwise lost. There are many examples of backup applications which can be used to create backup copies for data processing systems. Time Machine on Macintosh OS X systems is one example of a backup application which can make multiple snapshots over time so that a user can see deleted files in prior snapshots or view the current files of the user in the latest snapshot. As is known in the art, Time Machine can operate by copying new files since the last backup or snapshot, from a source volume, such as the bootup hard drive or other storage device of a computer or other data processing system, to a backup volume such as a backup hard drive or other storage device. FIG. 1A shows an example 101 of a data processing system 102 with a source volume 103 and a backup volume 104. The original files are typically on the source volume 103, and Time Machine or other backup applications can create copies of the files on the source volume and store those as backup files on the backup volume 104. The data processing system 102 can include one or more processors and one or more busses as is known in the art.

Figure 1B:
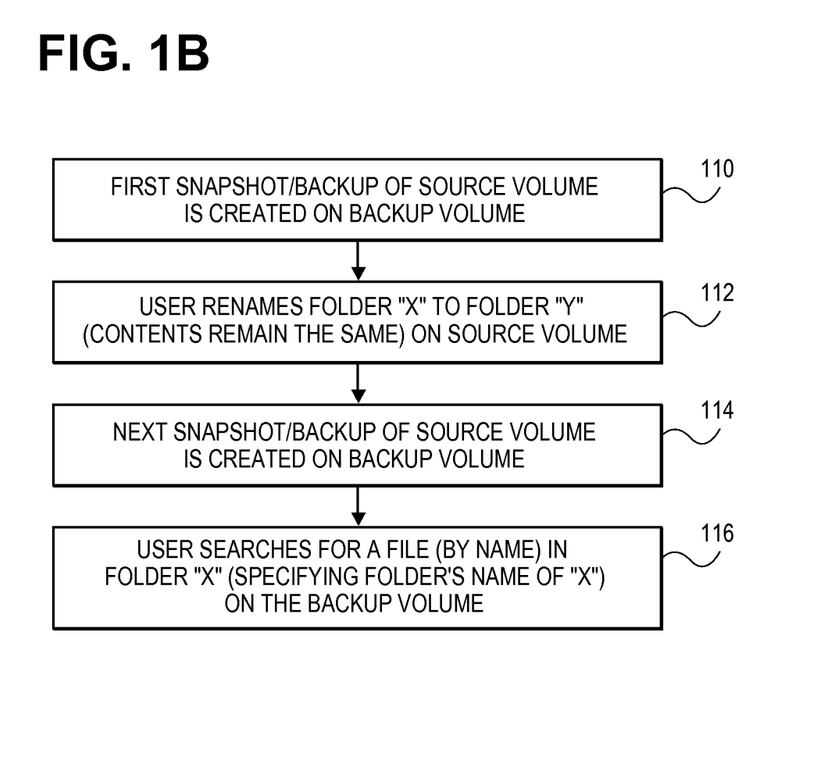
FIG. 1B is a flowchart illustrating a particular example of several backup operations and a search operation.

In the past, when a directory, such as a user's folder, was moved or renamed, some backup applications, such as Time Machine, copied the entire directory that was moved or renamed and kept the old directory in its original place and created a new copy at the new location of the directory; the renaming of the file effectively can be considered a new location as the new name results in a location specified by the new path name in the file system. If the backup application does not create a copy of the entire directory when the directory is moved or renamed, some searching systems, such as those which search for full text content of files, such as Spotlight on the Macintosh OS X operating system, may not find existing files within the directory on the backup volume if the user uses a search query that includes a scope or path in the query, such as find the file "squid" in the folder "X". FIG. 1B shows an example of how this can happen. In operation 110, a first snapshot or backup of the source volume is created on the backup volume, and then in operation 112, the user renames folder "X" to folder "Y" on the source volume. The contents of the folder remain the same, in other words the files within the folder remain the same, however the name of the folder has been changed. In operation 114, the next snapshot or backup of the source file is created on the backup volume and then the user attempts to search for a file by name and also specifies a particular folder to search in, in this case the folder "X". If no duplication of the directory occurred when backup operation 114 was performed, then the scope search specified in operation 116 will not find the file specified by name because the folder X was renamed to folder Y in operation 112.

SUMMARY OF THE DESCRIPTION

Methods and systems for searching a backup volume use, in one embodiment, a move marker file to indicate attributes for a new name space and optionally also indicate attributes for a prior name space of a directory on a source volume, the directory having been moved on the source volume between backup snapshot operations in which data on the source volume is backed up to the backup volume. In one embodiment, the move marker file is used when a scoped search query (such as a search query which specifies particular folders or directories as a search parameter) is requested, and it is used by extracting, from the name spaces in attributes in the move marker file, the set of scopes that should be examined in the search even if the user does not specify all of the possible scopes or specifies only the old folder name, etc. A scope will be understood to mean a path name or folder identifier, such as folder "X". The move marker file in effect, specifies the set of proper path names to use in a scope search based upon its attributes of the old and new name spaces. Hence, for example, a user can specify the file name and either the old or the new path of the folder (with a Boolean AND) in the search query, and the system will still find the file even when the moved directory is linked, not copied, by the backup application.

In one embodiment, the attributes can be a triplet of attributes, referred to as an attribute triplet that can include a path name identifier and a start of life date/time and an end of life date/time data, and these attributes can be stored in a move marker file that is added into the parent directory of the moved or renamed directory. In one embodiment, the attributes can be similar to those described in U.S. published Patent Application Publication No. 2008/0307016 which is hereby incorporated herein by reference. In one embodiment, the marker files are used as siblings to the moved files and they specify a new name space (for example, a unique integer) for the attribute triplets (such as path/begin date/end date). Each file under the move point (for example under the parent directory) has its life time in the original name space ended and a new begin/end/path triplet can be added in the new name space.

In one embodiment, an embodiment of the invention can be a machine readable non-transitory storage medium containing executable instructions which, when executed, cause a data processing system to perform a method as described herein. The method can include creating a first backup of a source volume, the first backup being stored on a backup volume and then receiving an input that a directory has been moved or renamed in a hierarchical file system of the source volume of the data processing system, the directory having been moved or renamed after creating the first backup. The method can also include storing an identifier that indicates that the directory has been moved or renamed and creating, on the backup volume, a move marker data structure in response to the directory having been moved or renamed. The creation of the move marker can occur during the performance of a second backup of the source volume to the backup volume, wherein the second backup will contain the moved or renamed directory. The move marker data structure can be a move marker file stored in a parent directory of the renamed or moved directory and can specify a first time parameter for a new name space associated with a new name or a new path of the directory that has been moved or renamed. In one embodiment, the directory can be displayed as a folder in a graphical user interface, and the user can rename or move that folder through the use of the graphical user interface, thereby resulting in the directory having been moved or renamed. The storing of an identifier that indicates that a directory has been moved or renamed may be performed by a file system on the data processing system that keeps track of changes to directories and stores information with respect to those changes; such operations are known in the art for existing file systems. This identifier, which indicates that a directory has been moved or renamed, can be stored on the source volume and is used by, in one embodiment, a backup operation to create the move marker when the backup application creates the second backup of the source volume. In one embodiment, the move marker data structure can specify a second time parameter which indicates an ending date and time for an old name space associated with the prior name or path of the directory before being moved or renamed, and the first time parameter can be a beginning date and time for the new name space. The backup volume can include a plurality of move marker data structures, each of which includes the same name space identifier as part of the attributes in the move marker file to allow a search query to find all move markers without requiring multiple passes through a set of directories when searching for move markers. In one embodiment, when the directory is moved or renamed, the backup application does not create a copy of the directory when the second backup is created as long as the files and folders within the directory are not changed.

One method, according to the present invention also uses these move markers when performing a search, and in particular, a scoped search in which a search query specifies one or more folders in addition to other search parameters. An example of a search query which specifies folders or other locations or is otherwise a scope search is: squid AND pasta AND folder "X"; in this case, the user has requested the system to find all files containing the words squid and pasta in the folder X. The Boolean AND operators require that all of these parameters be satisfied in order to return a matching result as is known in the art. According to an embodiment of the present invention, the move markers are used to create a union of all name spaces obtained from the move markers in order to determine a proper search scope or path received from a search input or a navigation input. In one embodiment, the searching is performed on the backup volume and can either be a search operation or a navigation operation in which the user is navigating through folders in the backup volume.

The present invention includes the various methods described herein as well as systems which perform those various methods and also includes machine readable non-transitory storage media which contain executable instructions which when executed by a data processing system cause the system to perform any one of the methods described herein.

Other features of the present invention will be apparent from the accompanying drawings and from the detailed description which follows.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 2:
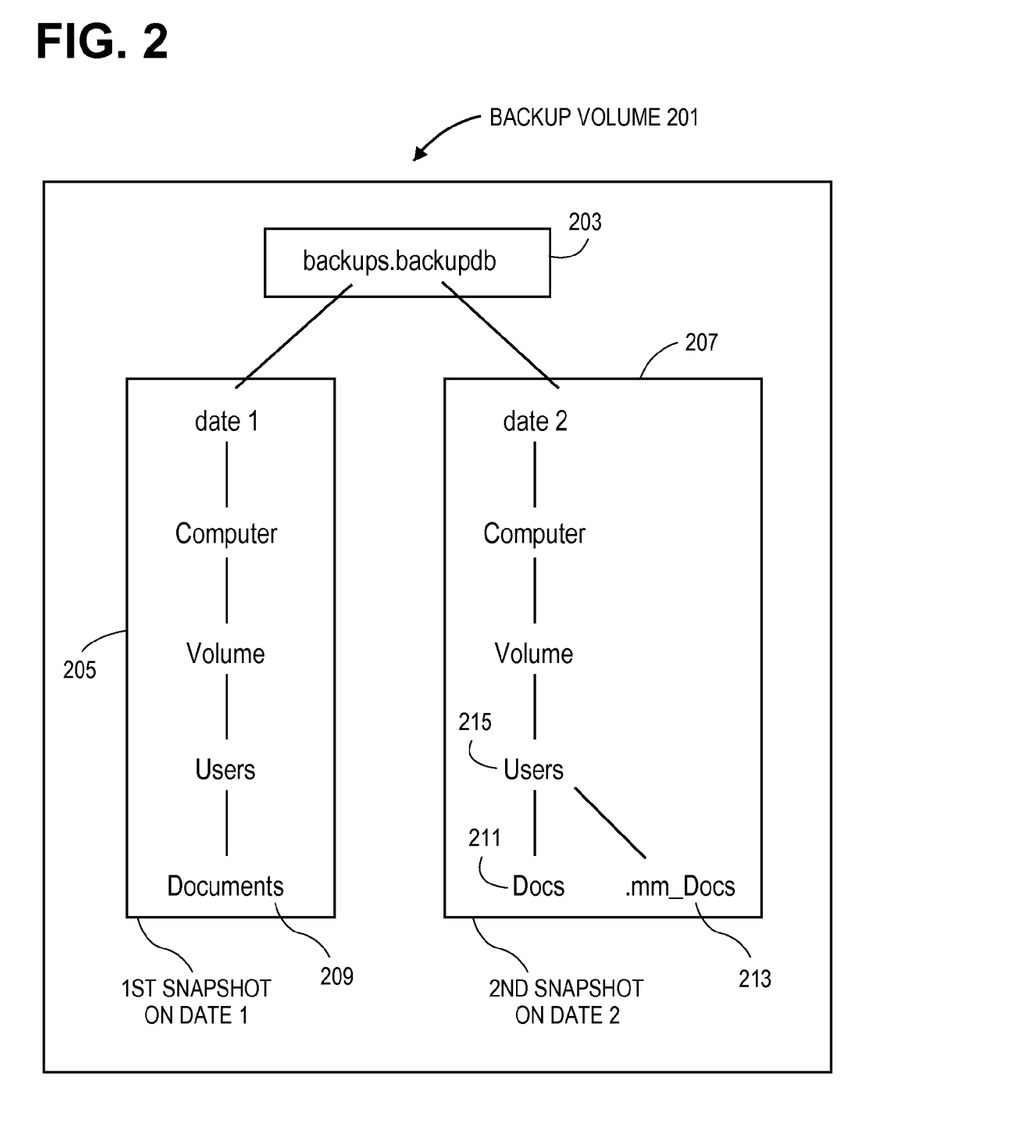
FIG. 2 shows an example of a backup volume used according to one embodiment of the present invention which includes at least one move marker file.

FIG. 2 shows an example of a backup volume that includes, after a second backup operation, a move marker file which has been added in response to determining that a directory has been renamed or moved. FIG. 2 shows the backup volume 201 after a second backup operation has created a second snapshot on a second date. In particular, a backup application, such as Time Machine, has created a first snapshot on date 1, shown as snapshot 205 and has created snapshot 207 which is a second snapshot on date 2. In one embodiment, the backup application can create a complete backup of all files in snapshot 205 and an incremental backup for changed or modified files or new files for snapshot 207. It will be understood that the backup can be performed across multiple directories or folders and can be a complete backup of the entire source volume or only a portion of the source volume, such as only a portion of selected folders on the source volume. In one embodiment, all the snapshots can be stored in a single backup directory 203, and the backup volume 201 can employ a hierarchical file system in which directories and subdirectories are in a file system hierarchy as is known in the art. A document directory 209 exists on the backup volume 201 and is stored in the hierarchy under the user's folder or directory which is the parent directory for the documents directory 209. This snapshot 205 is performed before snapshot 207 and before the user or the system has renamed or moved documents directory 209. After the backup operation creates snapshot 205, the user or the system renames or moves one or more directories. In the example shown in FIG. 2, the user has renamed the documents directory 209 to be the Docs directory 211 as shown in snapshot 207. A data structure of the file system on the source volume can include information that specifies that a folder or directory was renamed or moved, and this information can be used at backup time by a backup application when creating the snapshot 207 in order to tell the backup operation or application to create one or more move marker files, such as move marker file 213, and to store that move marker file in the parent directory of any directory which has been renamed or moved. In the example shown in FIG. 2, the move marker file 213 is stored in the parent directory 215 which contains the renamed Docs directory 211 as shown in the snapshot 207 of FIG. 2. It will be understood that the documents directory 209 is in the old name space and that the Docs directory 211 is in the new name space for the attribute triplets that are described herein.

Figure 3:
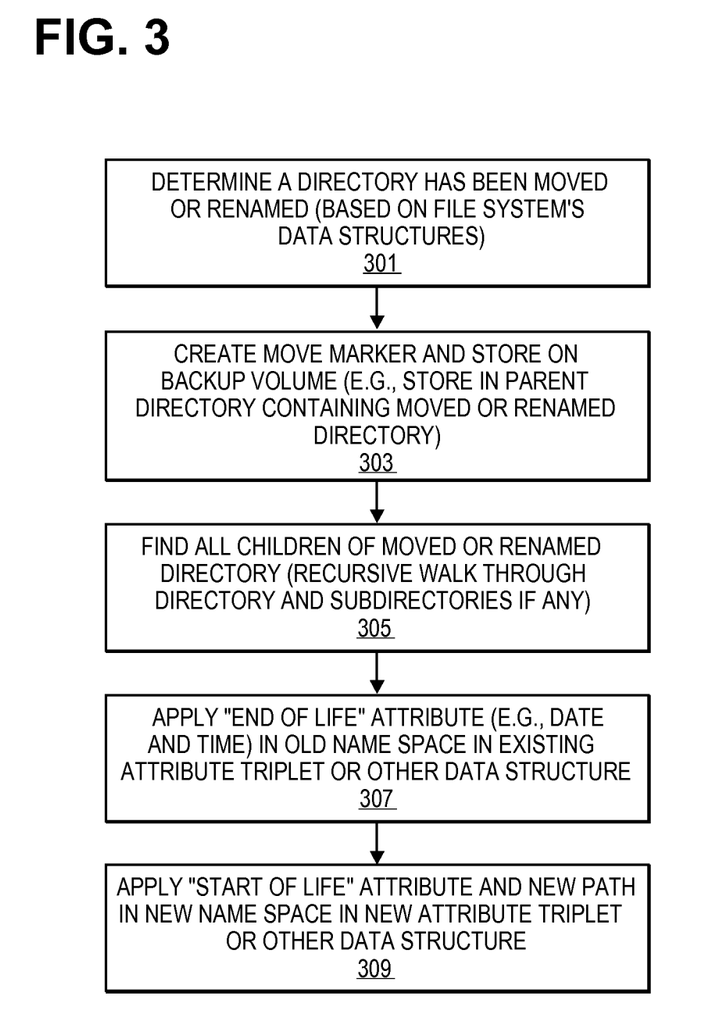
FIG. 3 is a flowchart depicting a method according to one embodiment of the present invention in which move markers are created.

FIG. 3 shows an example of a method according to one embodiment in which one or more move markers are created in response to a directory having been moved or renamed on a source volume. The move markers are created and stored on a backup volume based upon the changes to directories on the source volume. The method shown in FIG. 3 can be performed by a backup application in one embodiment at the time that the backup application is performing a subsequent backup operation, such as creating the second snapshot 207 shown in FIG. 2 after the first snapshot has been created by the backup application on the backup volume. In operation 301, the system determines that a directory has been moved or renamed. In one embodiment, this determination relies upon the file system's data structures which indicate directories which have been moved or renamed. In one embodiment, the only change to the directory was the moving or renaming of the directory and no structures within the directory have changed and this can be specified by information in the file system's data structures. This information can be used at backup time by the backup application to determine that, since the last backup or snapshot, a directory has been moved or renamed (without changes) and hence a move marker will be created in operation 303 because a directory has been moved or renamed. In operation 303, the move marker is created and stored on the backup volume. In one embodiment, the move marker can be a file which is stored in the parent directory containing the moved or renamed directory. In operation 305, the system determines or finds all children of the moved or renamed directory which can involve a recursive walk through the directory and subdirectories if any. In one embodiment, for each of the children found in operation 305, the method applies, in operations 307 and 309, an "end of life" attribute in the old name space in an existing attribute triplet or other data structure and also applies a "start of life" attribute in a new name space in the new attribute triplet or other data structure. In one embodiment, operation 307 may be optional. These attributes allow a search application, such as Spotlight on the Macintosh OS X operating system, to find files on the backup volume even though a renamed directory or moved directory has not been duplicated; in other words, Spotlight can still find files even if the user specifies a scope search which requires the search results to include items founds in a directory that has been renamed when the user specifies the old name of the directory. In one embodiment, according to the method shown in FIG. 3, each file under the move point has its lifetime and the original name space ended and a new begin/end/path triplet is added in the new name space for the file. In one embodiment, the move markers can be in the same name space for all of the move directories across the file system on the backup volume in order to allow the search query to find all move markers and therefore avoiding multiple passes through multiple directories.

The use of the method shown in FIG. 3 allows the data processing system to continue to use prior index data structures and also prevents the loss of data, such as files will not appear missing from the old location or missing in the new location when a search is performed. The use of a single move file for each directory that has been moved rather than one new file per file that is affected by the move also provides an advantage in that it minimizes the number of extra files that are created as a result of the method shown in FIG. 3.

Figure 4:
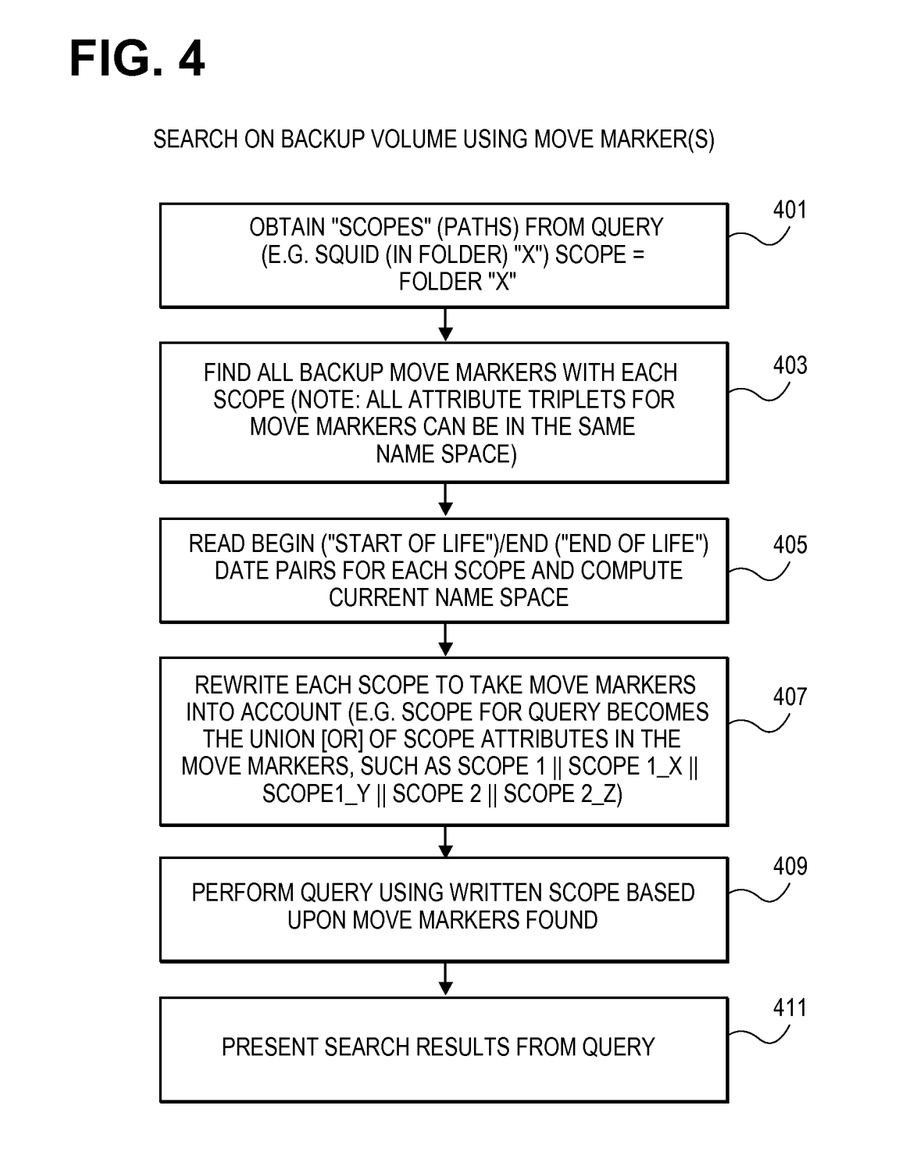
FIG. 4 is a flowchart illustrating a method according to one embodiment of the present invention in which move markers are used during a search process on a backup volume.

FIG. 4 shows an example of the use of move markers when a search is performed on a backup volume according to one embodiment of the present invention. In operation 401, the search application, such as Spotlight, can obtain the scopes or paths from the search query. For example the search query can be "squid" AND folder "X". In this case, the user has used the Boolean AND operator to specify the user wants to see all files in folder X that include the word "squid". In this case, the scope or path in the search query is the name of the folder "X". Using the obtained scopes or paths from operation 401, the system finds all backup move markers on the backup volume within each specified scope that was obtained in operation 401. This is shown as operation 403. As previously noted, all attribute triplets move markers can be in the same name space, and hence the search application can access that name space to find all move markers and obtain the scopes in operation 401. Then in operation 405, the search application can read the begin and end data pairs for each scope and compute a current name space based upon the name spaces specified in the attribute triplets in order to determine all of the different directories or folders that need to be specified in a rewritten search query. Then in operation 407, each scope is rewritten to take into account move markers that specify the various name spaces that need to be added to the search query. For example, the scope for the query becomes the union of scope attributes in the move markers found in operation 403. This union represents a Boolean OR operation across the different directories found from the move markers in operation 403. Then, the search query can be executed using the rewritten scope which has been based upon the move markers that were found according to this method. Then in operation 411 the search results that are obtained from the performance of the search query can be presented to a user, such as they can be displayed to a user or spoken to the user.

Figure 5:
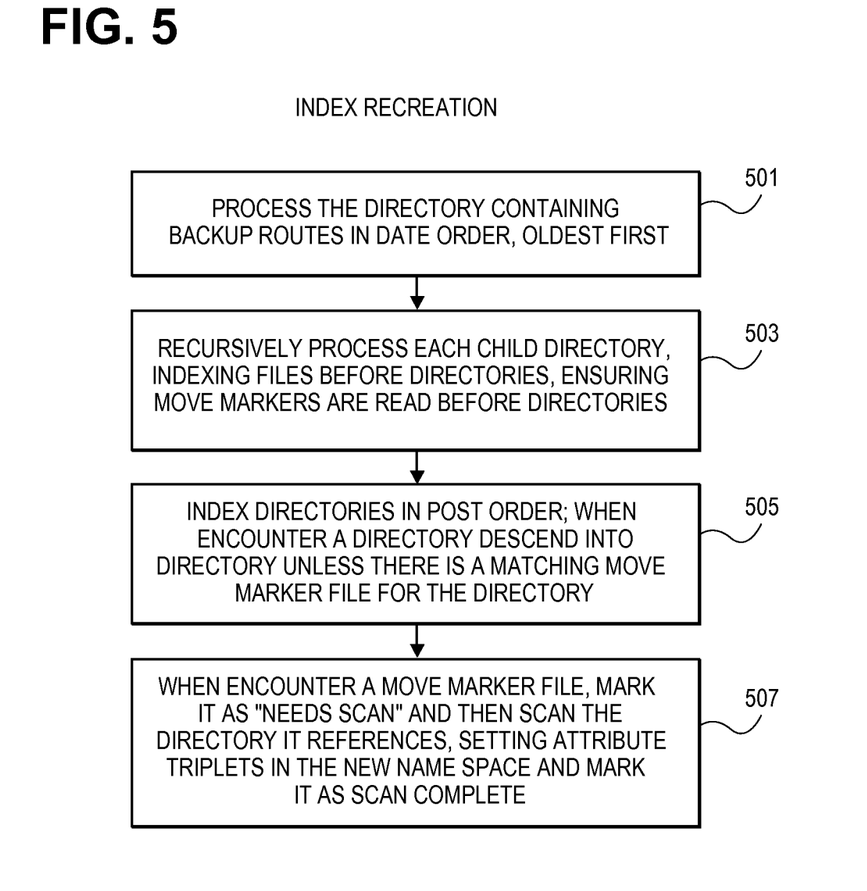
FIG. 5 is a flowchart illustrating a method, according to one embodiment, for the recreation of an index on a backup volume which contain move markers according to one embodiment of the present invention.

FIG. 5 shows an example of a method according to one embodiment for recreating an index on a backup volume when a search application data structure becomes corrupt on that backup volume. This recreation method takes into account move marker files in order to properly set attribute triplets to reflect directories that have been moved or renamed. In operation 501, the search application can process the directory containing backup routes in the date order, oldest being done first. Then in operation 503, the search application recursively processes each child directory, indexing files before directories, and ensuring that move markers are read before reading directories. In operation 505, the search application indexes directories in post order and when it encounters a directory, it descends into a directory unless there is a matching move marker file for the directory. In operation 507, when the search application encounters a move marker file, it can mark the file as needing a scan and then scan the directory it references, setting attribute triplets in the new name space and marking the scan as complete.

Figure 6:
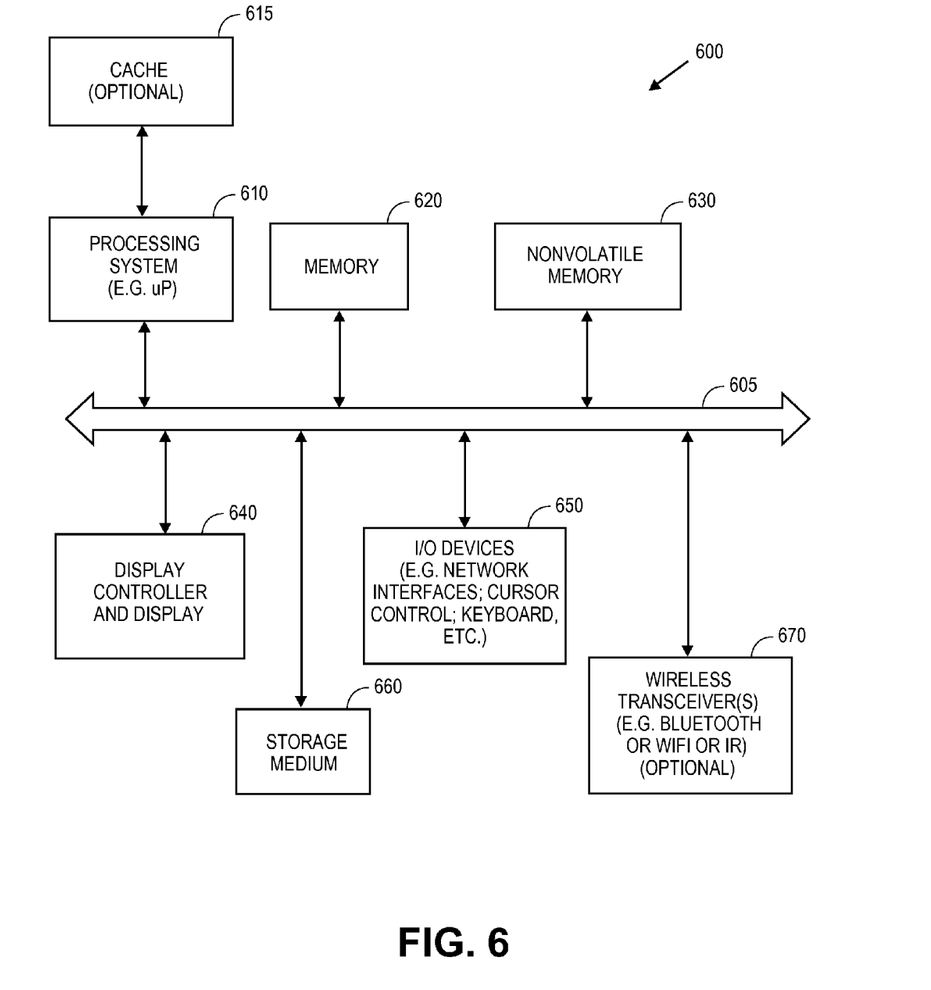
FIG. 6 shows an example of a data processing system which can be employed in one or more of the embodiments described herein.

FIG. 6 is a block diagram of one embodiment of a data processing system such as a computing system. While FIG. 6 illustrates various components of a computing system, it is not intended to represent any particular architecture or manner of interconnecting the components as such details are not germane to the present inventions. Personal digital assistants (PDAs), cellular telephones, smart phones, tablet computers, media players (e.g. an iPod®), devices which combine aspects or functions of these devices (a media player combined with a PDA and a cellular telephone in one device), network computers, an embedded processing device within another device, consumer electronic devices, and other data processing systems which have fewer components or perhaps more components may also be used to implement the techniques described herein and may be one or more of the data processing systems described herein. The computing system shown in FIG. 6 may, for example, be a Macintosh computer from Apple Inc. or a computer that runs the Windows® operating software from Microsoft Corporation.

Computing system 600 includes bus 605, which is coupled to one or more microprocessors to form processing system 610. Bus 605 is also coupled to memory 620 and to a non-volatile memory 630, which may be a magnetic hard drive in certain embodiments, or flash memory in other embodiments. Bus 605 is also coupled to display controller and display 640 and one or more input/output (I/O) devices 650.

Further, bus 605 may be coupled to storage medium 660, which can be an external hard disk drive or other device where data may be stored. In one embodiment, "snapshots" of files stored on a primary storage device (e.g., hard disk) may be stored on a secondary storage device (e.g., another hard disk). Storage medium 660 may be used to store snapshots and/or other data as a backup volume to memory 630 which can be a source volume. In alternate embodiments, snapshots may be stored by other devices including, for example, the device on which the original file is stored.

Processing system 610 may optionally be coupled to cache 615. Processing system 610 may include one or more microprocessors, such as a microprocessor from Intel. Bus 605 interconnects these various components together in a manner which is known in the art. Typically, the input/output devices 650 are coupled to the system through input/output controllers.

Memory 620 may be implemented as dynamic RAM (DRAM) which provides fast access to data but requires power continually in order to refresh or maintain the data in memory 620. Non-volatile memory 630 may be a magnetic hard drive or a flash memory or other non-volatile memory which retains data even after power is removed from the system. While FIG. 6 shows that non-volatile memory 630 is a local device coupled directly to the rest of the components in the data processing system, it will be appreciated that other embodiments may utilize a non-volatile memory which is remote from a system, such as a network storage device, which is coupled to the data processing system through a network interface, such as a modem or an Ethernet interface.

Bus 605 may include one or more buses interconnected through various bridges, controllers, and/or adapters. In one embodiment, I/O controller 650 may include a USB compliant adapter for controlling USB compliant peripherals and an IEEE-1394 controller for IEEE-1394 compliant peripherals. Many other peripheral devices may also be supported.

Aspects of the inventions described herein may be embodied, at least in part, in software. That is, the techniques may be carried out in a computer system or other data processing system in response to its processor or processing system executing sequences of instructions contained in a memory, such as memory 620 or non-volatile memory 630. These memories can be machine readable non-transitory storage media that store executable program instructions, which when executed by a data processing system cause the system to perform one or more methods described herein. In various embodiments, hardwired circuitry may be used in combination with the software instructions to implement the present inventions. Thus, the techniques are not limited to any specific combination of hardware circuitry and software or to any particular source for the instructions executed by the data processing system. In addition, throughout this description, various functions and operations are described as being performed by or caused by software code to simplify description. However, what is meant by such expressions is that the functions result from execution of the code by a processing system.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A machine readable non-transitory storage medium containing executable instructions which when executed cause a data processing system to perform a method, the method comprising:
  creating a first backup of a source volume, the first backup being stored on a backup volume;
  automatically receiving an input that a directory has been moved or renamed in a hierarchical file system of the source volume of the data processing system, the directory being moved or renamed after creating the first backup;
  storing an identifier that indicates that the directory has been moved or renamed;
  creating, on the backup volume, a move marker data structure in response to the directory having been moved or renamed, the move marker data structure specifying a first time parameter for a new name space associated with a new name or new path of the directory;
  creating a second backup of the source volume, the second backup being a snapshot stored on the backup volume and containing the moved or renamed directory;
  wherein the move marker data structure specifies a second time parameter indicating an ending date and time for an old name space associated with the prior name or path of the directory before being moved or renamed;
  wherein the first time parameter is a beginning date and time for the new name space; and
  wherein the backup volume includes a plurality of move marker data structures, each of which includes the same name space identifier for the first and the second time parameters to allow a query to find all move markers without requiring multiple passes through a set of directories.

2. The medium as in claim 1 wherein the identifier, which indicates that the directory has been moved or renamed, is stored on the source volume and is used by a backup application to create the move marker.

3. The medium as in claim 1 wherein the move marker data structure is a file stored in a parent directory that contains the moved or renamed directory, and wherein the directory is displayed as a folder in a graphical user interface.

4. The medium as in claim 1 wherein the directory is moved or renamed without changing the content of the files and folders within the directory and wherein the directory is not copied when the second backup is created.

5. The medium as in claim 4, wherein the method further comprises:
creating a union of all name spaces obtained from the plurality of move marker data structures for a search scope received from a search input or a navigation input.

6. A data processing system for searching a backup volume, the system comprising:
a source volume on a source storage device, to store data in a hierarchical file system;
a backup volume on a backup storage device, attached to the source volume, the backup volume to store backups of the source volume;
a first backup, stored on the backup volume, to preserve a snapshot of the source volume at a first time point;
a second backup, stored on the backup volume, to preserve a snapshot of the source volume at a second time point; and
a move marker data structure, stored on the backup volume, the move marker data structure to specify at least one time parameter and a name space identifier for a directory that has been moved or renamed between the first time point and the second time point, wherein the backup volume includes a plurality of the move marker data structures, each specifying the same name space identifier, to allow a query to find the plurality of move markers during a search of the backup volume.

7. The data processing system as in claim 6, further comprising an identifier stored on the source volume, the identifier to indicate that a directory has been moved or renamed.

8. The data processing system as in claim 7, wherein the second backup includes the directory that has been moved or renamed, and during the creation of the second backup, the identifier is used to create one of the plurality of move markers.

9. The data processing system as in claim 7, wherein the directory that has been moved or renamed was is moved or renamed without changing or copying the content of the files and folders within the directory.

10. The data processing system as in claim 9 wherein each move marker is a file stored in a parent directory that contains the moved or renamed directory, and wherein the directory is displayed as a folder in a graphical user interface.

11. The data processing system as in claim 10, wherein the move marker data structure comprises:
a first time parameter, to indicate a beginning date and time for a new name space associated with a new name or new path of the directory, the directory having been moved or renamed; and
a second time parameter, to indicate an ending date and time for an old name space associated with the prior name or path of the directory before being moved or renamed.

12. The data processing system as in claim 11, wherein all move markers stored on the backup volume are in the same name space, to allow a query to find all move markers without requiring multiple passes through a set of directories.

13. The data processing system as in claim 12 further comprising:
a union data structure, to determine a search scope or a navigation path, wherein the union is a combination of all name spaces obtained from the plurality of move marker data structures.

14. A method of performing a backup operation comprising:
creating a first backup of a source volume, the first backup being stored on a backup volume;
receiving an input that a directory has been moved or renamed in a hierarchical file system of the source volume of the data processing system, the directory being moved or renamed after creating the first backup;
storing, on the source volume, an identifier that indicates that the directory has been moved or renamed;
creating, on the backup volume, a move marker data structure in response to the directory having been moved or renamed, the move marker data structure specifying a first time parameter representing a beginning date and time for a new name space associated with a new name or new path of the directory, and a second time parameter indicating an ending date and time for an old name space associated with the prior name or path of the directory; and
creating a second backup of the source volume, the second backup being a snapshot stored on the backup volume and containing the moved or renamed directory, wherein the backup volume includes a plurality of move marker data structures, each including the same name space identifier for the first and the second time parameters, to allow a query to find all move markers without requiring multiple passes through a set of directories.

15. The method as in claim 14 wherein the move marker data structure comprises:
a first time parameter, to indicate a beginning date and time for a new name space associated with a new name or new path of the directory, the directory having been moved or renamed; and
a second time parameter, to indicate an ending date and time for an old name space associated with the prior name or path of the directory before being moved or renamed.

16. The method as in claim 14 further comprising recreating an index on a backup volume if a search application data structure suffers data corruption.

17. The method as in claim 16, wherein recreating an index on a backup volume comprises:
processing the directory containing backup routes in date order, oldest first; and
processing a child directory of the directory, wherein processing a directory comprises,
indexing each file and move markers in the directory, and
descending into a child directory if there is not a move marker for the child directory.

18. The method as in claim 17, wherein indexing a move marker in a directory comprises:
marking the move marker as needing a scan;
scanning the directory referenced by the move marker, including setting attributes in a new name space; and
marking the scan as complete.

19. The medium as in claim 1 further comprising recreating an index on a backup volume if a search application data structure suffers data corruption, wherein the recreating comprises:
processing the directory containing backup routes in date order, oldest first; and
processing a child directory of the directory, wherein processing a directory comprises, indexing each file and move markers in the directory, and descending into a child directory if there is not a move marker for the child directory.

* * * * *